United States Patent [19]
Webb

[11] Patent Number: 5,871,222
[45] Date of Patent: Feb. 16, 1999

[54] DETACHABLE BALL HITCH APPARATUS AND METHODS

[76] Inventor: Micheal L. Webb, P.O. Box 285, Lindsay, Okla. 73052

[21] Appl. No.: 840,593

[22] Filed: Apr. 22, 1997

[51] Int. Cl.⁶ .................................................. B60D 1/06
[52] U.S. Cl. ........................ 280/511; 280/504; 280/507; 403/348; 403/349
[58] Field of Search .................................. 280/511, 504, 280/507, 416.1, 491.1, 491.5; 403/349, 348, 321, 325

[56] References Cited

U.S. PATENT DOCUMENTS

| 2,901,804 | 9/1959 | Williams | 403/348 |
|---|---|---|---|
| 4,201,400 | 5/1980 | Hoogenbosch | 280/511 |
| 4,433,854 | 2/1984 | Smith | 280/511 |
| 4,522,421 | 6/1985 | Vance | 280/511 |
| 4,938,496 | 7/1990 | Thomas et al. | 280/511 |
| 5,104,138 | 4/1992 | Allen | 280/433 |
| 5,116,072 | 5/1992 | Swenson | 280/511 |
| 5,169,168 | 12/1992 | Harry et al. | 280/511 |
| 5,395,131 | 3/1995 | Herrick | 280/507 |
| 5,511,814 | 4/1996 | Floyd | 280/507 |
| 5,513,622 | 5/1996 | Musacchia, Sr. | 403/349 |
| 5,741,022 | 4/1998 | Wass et al. | 280/507 |

Primary Examiner—Peter C. English
Assistant Examiner—Gary Savitt
Attorney, Agent, or Firm—McAfee & Taft

[57] ABSTRACT

A ball hitch apparatus comprises a ball portion having a ball connected to a shaft, an aperture longitudinally defined therethrough and a slot communicating with the aperture. A rod is disposed in the aperture and biased toward the ball and a pin is attached to the rod and movable within the slot. A socket portion has a central bore for receiving the shaft and a keyway communicating with the central bore for receiving the pin. The ball portion and socket portion are releasably secured in both a first locking position characterized by the rod extending beyond the ball and a second locking position characterized by the rod positioned substantially flush with the top of the ball.

20 Claims, 2 Drawing Sheets

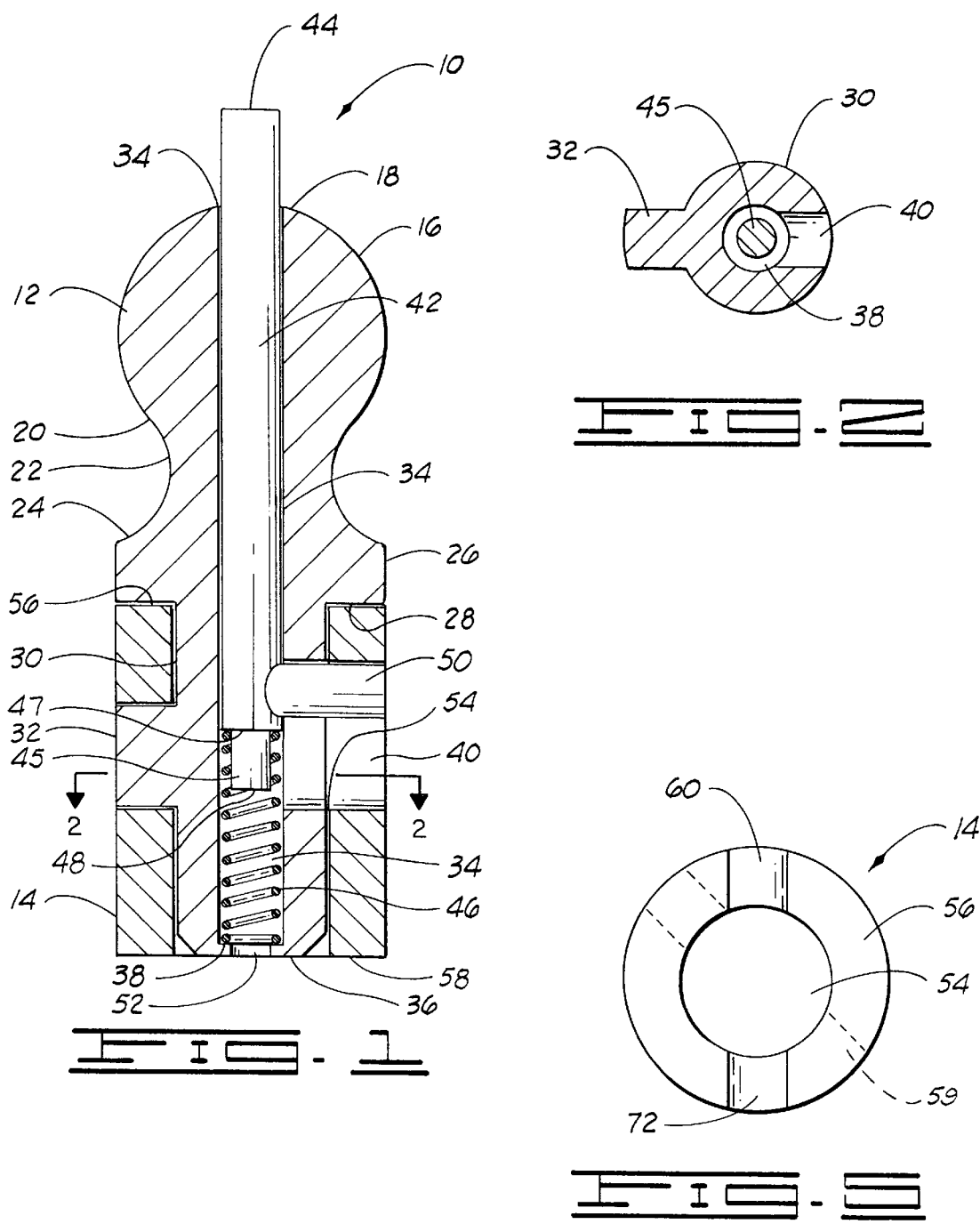

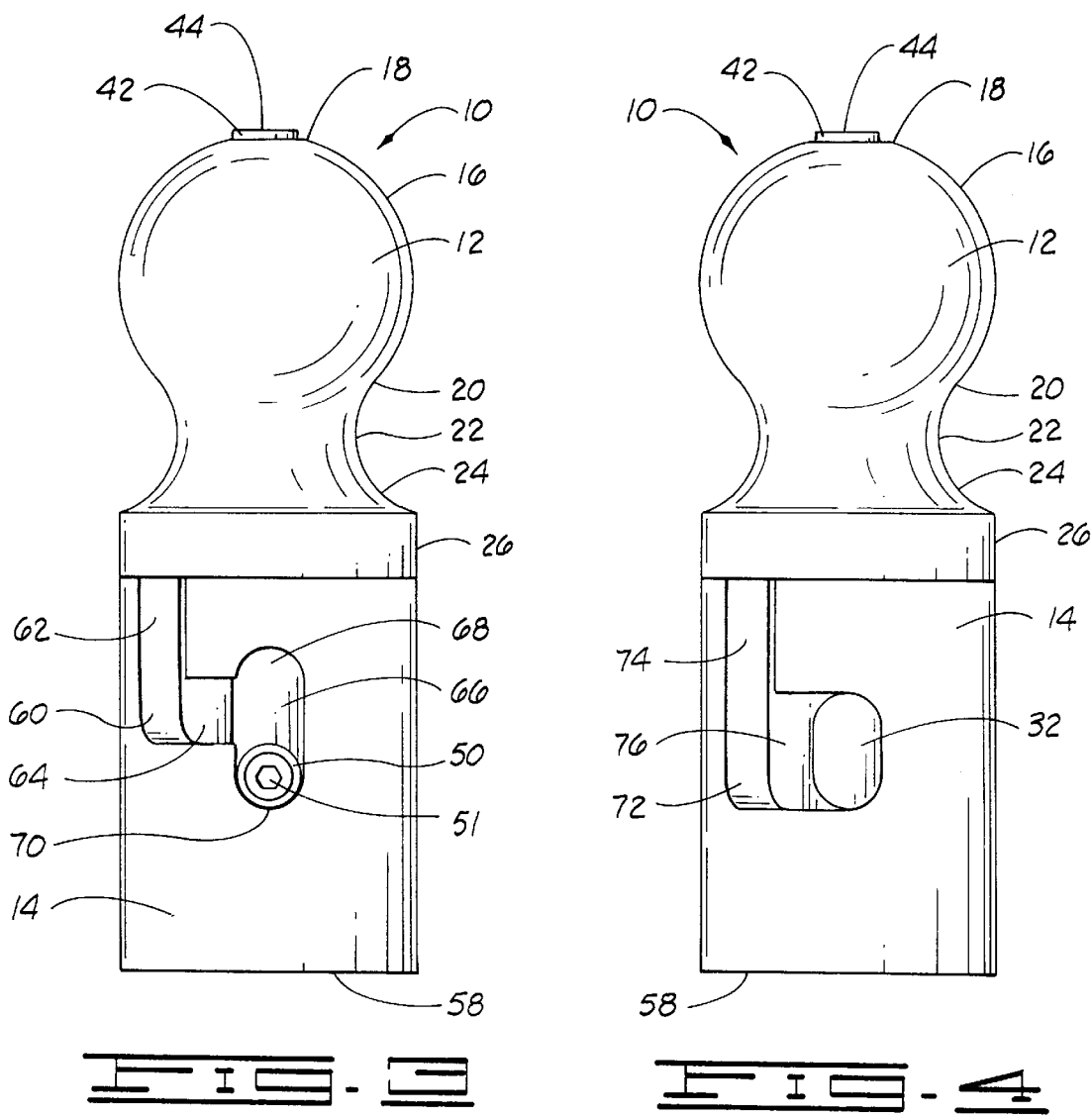

DETACHABLE BALL HITCH APPARATUS AND METHODS

BACKGROUND OF THE INVENTION

This invention relates generally to towing devices and more particularly, but not by way of limitation, to detachable ball hitch apparatus and methods which are releasably securable and interchangeable with different sized hitch balls.

Towing devices attached to a tow vehicle are commonly used to pull (or push) trailers. A hitch ball is attached to the bumper, frame, draw bar or bed of a tow vehicle. The front portion or tongue of the trailer has a coupling mechanism which can be positioned over the ball. The coupling mechanism on the trailer secures the trailer to the ball.

There are several different standard sized balls which correspond to different sized coupling mechanisms. Accordingly, it is desirable that the balls be interchangeable. Further, it is often desirable that the ball be removable. For example, a hitch ball attached to the bed of a tow vehicle can interfere with loading materials on the bed. Also, a hitch ball is often greasy and can stain clothing. Finally, a hitch ball may be stolen if not removed.

Detachable towing devices as well as those having interchangeable hitch balls are available. For example, U.S. Pat. No. 4,201,400 shows a detachable hitch ball. The ball has a centrally disposed pin which forces ball bearings into a circumferential groove in the socket to secure the ball to the socket. Also, U.S. Pat. Nos. 5,169,168, 4,938,496 and 5,116,072 show various embodiments of a detachable ball pinned to a shank.

While prior hitches work adequately in many circumstances, there are problems and shortcomings. Some of the prior art hitches are difficult to use, time-consuming to attach and detach and have multiple moving and unconnected parts which are subject to wear and loss.

Thus, there is a need for improved detachable ball hitch apparatus and methods which are simple in construction, reliable and easy to use.

SUMMARY OF THE INVENTION

The present invention provides improved detachable ball hitch apparatus and methods which meet the needs described above and overcome the shortcomings of the prior art.

The ball hitch apparatus for attachment to a tow vehicle for towing a trailer comprises a ball portion having a ball connected to a shaft, an aperture longitudinally defined therethrough and a slot communicating with the aperture. A rod is disposed in the aperture and biased toward the ball and a pin is attached to the rod and movable within the slot. A socket portion has a central bore for receiving the shaft and a keyway communicates with the central bore for receiving the pin, wherein the ball portion and the socket portion are releasably secured in both a first locking position characterized by the rod extending beyond a top of the ball and a second locking position characterized by the rod positioned substantially flush with the top of the ball.

The ball hitch apparatus comprises a ball portion having an aperture longitudinally defined therein. The ball portion further has a ball connected to a shaft, the shaft having a radially extending flange and a slot which communicates with the aperture, a biased rod disposed in the aperture, and a pin attached to the rod and movable within the slot. The ball hitch apparatus further comprises a socket portion having a central bore for receiving the shaft of the ball portion, a flange notch for receiving the flange and a locking keyway for receiving the pin, wherein an axial and rotational movement of the ball portion relative to the socket portion releasably secures the ball to the socket portion when the flange and the pin cooperate with the flange notch and the locking keyway, respectively.

The method of releasably securing a hitch ball to a socket assembly comprises providing a ball portion having a ball connected to a shaft, an aperture defined therein, a slot communicating with the aperture, a rod disposed in the aperture, and a pin attached to the rod and movable within the slot. The method further comprises providing a socket portion having a bore defined therein and a locking keyway having a first axial extent and a second axial extent connected by a circumferential extent. The method further comprises aligning the pin with the first axial extent, moving the shaft axially toward the socket such that the pin moves through the first axial extent, rotating the shaft relative to the socket such that the pin moves through the circumferential extent, and biasing the pin toward an end of the second axial extent such that the ball portion and the socket portion are releasably secured.

It is therefore a general object of the present invention to provide improved detachable ball hitch apparatus and methods. Other and further objects, features and advantages of the present invention will be readily apparent to those skilled in the art upon a reading of the following disclosure when taken in conjunction with the accompanying drawings.

BRIEF DESCRIPTION OF THE DRAWINGS

FIG. 1 is a vertical cross-sectional view of the apparatus of the present invention.

FIG. 2 is a cross-sectional view taken at line 2—2 of FIG. 1.

FIG. 3 is a perspective view of the apparatus of the present invention.

FIG. 4 is a perspective view of the present invention rotated 180° from the position shown in FIG. 3.

FIG. 5 is a plan view of a socket portion of the apparatus of the present invention.

DETAILED DESCRIPTION OF THE PREFERRED EMBODIMENTS

Referring to the drawings, presently preferred embodiments of the invention and their operation are illustrated. Like reference numerals refer to like parts throughout the drawings and this description.

Referring to FIG. 1, a presently preferred detachable ball hitch apparatus is illustrated and designated generally by the numeral 10. Apparatus 10 has a ball portion 12 and a socket portion 14.

Ball portion 12 has a ball 16 which is sized to be received by a coupling mechanism (not shown) located on a trailer (not shown). The coupling mechanism of the trailer rests on top 18 of ball 16 and the coupling mechanism of the trailer latches toward bottom 20 of ball 16. When the trailer is secured to ball 16, the trailer can pivot relative to ball 16 but is prevented from coming off ball 16 by the latching mechanism.

In a preferred embodiment, ball 16 is one of several standard sizes, but can be a custom size as well. A few standard sizes of ball 16 include 1⅞ inches and 2 inches, which size represents the diameter of ball 16. The size of ball 16 is matched to the size required for the coupling mechanism of the trailer. The size varies depending on the particular towing application and other factors such as the weight of the trailer.

The term trailer as defined herein includes any and all apparatus which can be towed (or pushed) by a tow vehicle. Thus, the definition of trailer as used herein includes boat trailers, enclosed trailer, car dollies and the like.

Ball 16 has a recessed area 22 adjacent a tapered area 24 which is adjacent a cylindrical flange 26. Cylindrical flange 26 has a bottom portion 28.

Shaft 30 is connected to ball 16 below cylindrical flange 26. A flange 32 is attached to and radially extends from a central portion of shaft 30. Flange 32 is oblong in shape.

Ball portion 12 has an aperture 34 centrally defined therein. Aperture 34 is defined along an axis of ball portion 12 and extends from top 18 of ball 16 to a bottom 36 of shaft 30. Plug 38 is positioned in aperture 34 near bottom 36 of shaft 30. It is noted that plug 38 can simply be a bottom of aperture 34, i.e., material which is not removed when aperture 34 is drilled.

Shaft 30 has a slot 40 radially disposed therein which communicates with aperture 34. Slot 40 is oblong in shape and is positioned approximately 180° opposite flange 32 as shown in FIG. 2. Rod 42, which has a circular cross section, is disposed in and movable within aperture 34. Rod 42 has a top 44, a bottom 48 and reduced diameter portion 45 located towards bottom 48. A shoulder 47 is adjacent the reduced diameter portion 45. In a preferred embodiment, top 44 of rod 42 extends beyond top 18 of ball 16. Rod 42 is biased toward ball 16 by biasing means such as spring 46. As shown in FIG. 1, reduced diameter portion 45 of rod 42 is positioned within spring 46. Spring 46 abuts shoulder 47 on one end and abuts plug 38 on the other end. Plug 38 may have a hole 52 centrally disposed therein so that water and other fluids and debris can drain from aperture 34.

Pin 50 is attached to rod 42 such that pin 50 radially extends from rod 42 in a direction normal to rod 42. A proximal end of pin 50 is crescent shaped such that pin 50 attaches flush to circular rod 42. Pin 50 is movable in an axial direction within oval-shaped slot 40 and upper and lower portions of slot 40 limit the axial movement of pin 50 and thus of rod 42. Shoulder 47 of rod 42 prevents spring 38 from sliding toward top 44 of rod 42. Since pin 50 is attached to rod 42 such as by screw 51 (as shown in FIG. 3) or by other means, pin 50 is also biased in the same direction, i.e., toward an upper portion of slot 40 in a preferred embodiment.

Referring to FIG. 1, and as better seen in FIG. 5, socket portion 14 has a central bore 54 defined therethrough. Central bore 54 of socket portion 14 is sized for receiving shaft 30 of ball portion 12. Thus, the diameter of central bore 54 is slightly larger than the outside diameter of shaft 30. Socket portion 14 has a top 56 adapted for abutting bottom portion 28 of cylindrical flange 26 of ball portion 12. Socket portion 14 also has a bottom 58 which can be attached to the bumper, frame, drawbar or bed of a tow vehicle as discussed further herein.

Referring to FIG. 3, socket portion 14 has a locking keyway 60 which adjoins and communicates with the central bore 54. Keyway 60 is adapted for receiving pin 50. As illustrated in FIG. 3, in a preferred embodiment keyway 60 is disposed entirely through a wall 59 of socket portion 14. However, keyway 60 can also be a groove which does not extend through wall 59.

Keyway 60 has a first axial extent 62 which extends from top 56 of socket portion 14 toward, but not reaching, bottom 58 of socket portion 14. A circumferential extent 64 adjoins or meets a lower portion of first axial extent 62 and extends circumferentially until circumferential extent 64 adjoins a second axial extent 66. Second axial extent 66 has a first end 68 and a second end 70 and adjoins circumferential extent 64 at a position between first end 68 and second end 70. As illustrated in FIG. 3, keyway 60 is 4-shaped.

Referring to FIG. 4 (a view that is rotated 180° from the position shown in FIG. 3), socket portion 14 has a notch 72 disposed entirely through wall 59 of socket portion 14. Notch 72 communicates with central bore 54 and is adapted for receiving flange 32. Notch 72 has an axial portion 74 which extends from top 56 of socket portion 14 axially toward, but not meeting, bottom 58 of socket portion 14. A circumferential portion 76 of notch 72 adjoins axial portion 74. As illustrated by FIG. 4, notch 72 is L-shaped.

Referring to FIG. 5, in a preferred embodiment, locking keyway 60 and notch 72 are oppositely disposed in socket portion 14, i.e., approximately 180° apart.

It is recognized that there are many possible configurations of locking keyway 60 and notch 72 other than the 4-shaped keyway 60 and L-shaped notch 72 shown in FIGS. 3 and 4, respectively. The most desirable configuration will prevent axial and rotational movement of ball portion 12 relative to socket portion 14 when apparatus 10 is in a locked position. As used herein, axial extent includes any keyway or notch having an axial component and circumferential extent includes any keyway or notch having a circumferential component. In other words, a keyway or notch diagonally disposed in socket portion 14 can constitute both an axial extent and a circumferential extent. Thus, V-shaped, W-shaped and other shaped keyways and notches are within the disclosure of this invention. This same discussion is applicable to keyway 60 as well as notch 72.

It is also noted that optimal keyway 60 and notch 72 design may depend on the direction in which rod 42 is biased. Since rod 42 can be biased toward bottom 36 of shaft, the keyway 60 and notch 72 can be configured accordingly.

Apparatus 10 has two locking positions, a first locking position illustrated in FIG. 1 and a second locking position illustrated in FIG. 3. In the first locking position illustrated in FIG. 1, rod 42 extends beyond top 18 of ball 16. In the first locking position, pin 50 is positioned toward a first end 68 (top) of second axial extent 66 of locking keyway 60. The second locking position, illustrated in FIG. 3, is characterized by rod 42 positioned substantially flush with top 18 of ball 16. In the second locking position, pin 50 is positioned toward second end 70 (bottom) of second axial extent 66 of locking keyway 60.

In both the first locking position and the second locking position, pin 50 in locking keyway 60 prevents rotational movement and flange 32 in notch 72 prevents axial movement of ball portion 12 relative to socket portion 14. Pin 50 moves from the first locking position to the second locking position when rod 42 is moved from a fully biased position shown in FIG. 1 to a fully depressed position shown in FIG. 3. Such movement would occur, for example, when a trailer hitch is positioned on ball 16.

Apparatus 10 further has an intermediate position in which pin 50 is aligned with circumferential extent 64 of locking keyway 60. In the intermediate position, rod 42 is partially depressed. This intermediate position allows for ball portion 12 to be rotated relative to socket portion 14 such that ball portion 12 can be secured and unsecured with respect to socket portion 14. In other words, in the intermediate position pin 50 can be moved from second axial extent 66 in which the apparatus can be secured in either a first locking position or a second locking position to first axial extent 62 in which axial movement between ball portion 12 and socket portion 14 is unrestricted.

In operation, ball portion 12 can be releasably secured to socket portion 14 by an axial and rotational movement of ball portion 12 relative to socket portion 14 in combination with temporarily depressing rod 42. More specifically, beginning with ball portion 12 and socket portion 14 separated, shaft 30 of ball portion 12 is aligned with central bore 54 of socket portion 14. Pin 50 of ball portion 12 is also aligned with first axial extent 62 of locking keyway 60 of socket portion 14. Next, shaft 30 of ball portion 12 is moved axially toward socket portion 14 such that pin 50 moves from top 56 of socket portion 14, through first axial extent 62 to the point where first axial extent 62 and circumferential extent 64 adjoin. Rod 42 must be partially depressed to the intermediate position in order for pin 50 to move to the junction between first axial extent 62 and circumferential extent 66. Next, ball portion 12 is rotated relative to socket portion 14 such that pin 50 moves from first axial extent 62, through circumferential extent 64 to second axial extent 66. Next, pin 50 is biased toward an end 68, 70 of second axial extent 66 such that ball portion 12 and socket portion 14 are releasably secured. In the embodiment illustrated in FIG. 1, pin 50 is biased toward first end 68 (top) of second axial extent 66 by the upward force of spring 46 exerted on rod 42.

During this assembly process, flange 32 moves through notch 72 similarly to the movement of pin 50 through locking keyway 60. Thus, when pin 50 is aligned with first axial extent 62, flange 32 is also aligned with axial portion 74 of notch 72. Likewise, when ball portion 12 is moved axially toward socket portion 14, flange 32 moves from top 56 of socket portion 14 to the junction of axial portion 74 and circumferential portion 76 of notch 72. Likewise, when ball portion 12 is rotated relative to socket portion 14, flange 32 moves to an end of circumferential portion 76 of notch 72.

The coupling mechanism of the trailer can now be positioned on ball 16. When the coupling mechanism of a trailer is positioned on said ball 16, the tongue weight of the trailer moves pin 50 from the first locking position at first end 68 in second axial extent 66 to the second locking position at second end 70 of second axial extent 66.

Apparatus 10 also includes means for attaching socket portion 14 to a tow vehicle. Such means for attaching include welding socket portion 14 to the bumper, frame, draw bar or bed of the tow vehicle. For example, socket portion 14 can be welded or otherwise attached to the bed of a tow vehicle such that top 56 of socket portion 14 is flush with the bed of the tow vehicle. Such attachment is advantageous in that socket portion 14 would not interfere with cargo or other items in the bed of the tow vehicle when ball portion 12 has been removed. Means for attaching also include a threaded shank (not shown) connected to bottom 58 of socket portion 14 such that the socket portion can be attached to the vehicle by a nut or other retaining means.

Once the socket portion has been attached to a tow vehicle by the various means available, ball portion 12 can be removed when not in use. Different ball portions 12 having the desired diameter of ball 16 can be interchanged and used in conjunction with socket portion 14. Thus, ball portion 12 can be quickly and easily secured to as well as detached from socket portion 14.

Thus, the present invention is well adapted to carry out the objects and attain the ends and advantages mentioned as well as those inherent therein. While preferred embodiments of the present invention have been illustrated for the purpose of the present disclosure, changes in the arrangement and construction of parts and the performance of steps can be made by those skilled in the art, which changes are encompassed within the scope and spirit of the present invention as defined by the appended claims.

What is claimed is:

1. A ball hitch apparatus for attachment to a tow vehicle for towing a trailer comprising:
    a ball portion having a ball connected to a shaft, an aperture longitudinally defined therethrough and a slot communicating with said aperture;
    a rod disposed in said aperture and biased toward said ball;
    a pin attached to said rod and movable within said slot; and
    a socket portion having a central bore for receiving said shaft and a keyway communicating with said central bore for receiving said pin,
    wherein said ball portion and said socket portion are releasably secured in both a first locking position characterized by said rod extending beyond a top of said ball and a second locking position characterized by said rod positioned substantially flush with said top of said ball.

2. The apparatus of claim 1 wherein said ball portion further comprises a flange radially extending from said shaft and said socket portion further comprises a notch communicating with said central bore for receiving said flange.

3. The apparatus of claim 2 wherein said notch is L-shaped.

4. The apparatus of claim 2 wherein said flange and said pin are oppositely disposed on said shaft.

5. The apparatus of claim 1 wherein said keyway has a first axial extent and a second axial extent connected by a circumferential extent.

6. The apparatus of claim 1 wherein a first axial extent of said keyway communicates with a top of said socket.

7. The apparatus of claim 5 wherein said pin is positioned toward a top of said second axial extent in said first locking position and said pin is positioned toward a bottom of said second axial extent in said second locking position.

8. The apparatus of claim 7 wherein positioning a trailer hitch on said ball moves said pin from said first locking position to said second locking position.

9. The apparatus of claim 7 wherein said circumferential extent adjoins said second axial extent at a point between said top and said bottom of said second axial extent.

10. The apparatus of claim 5 further comprising an intermediate position in which said pin is aligned with and movable within said circumferential extent for securing and unsecuring said ball portion from said hitch portion.

11. The apparatus of claim 1 wherein an axial and rotational movement of said ball portion relative to said socket portion in combination with temporarily depressing said rod releasably secures said ball portion to said socket portion.

12. A ball hitch apparatus comprising:
    a ball portion having an aperture longitudinally defined therein, said ball portion further having:
        a ball connected to a shaft, said shaft having a radially extending flange and a slot which communicates with said aperture;
        a biased rod disposed in said aperture; and
        a pin attached to said rod and movable within said slot; and a socket portion having a central bore for receiving said shaft of said ball portion, said socket portion further comprising:
   a flange notch for receiving said flange; and
   a locking keyway for receiving said pin, wherein an axial and rotational movement of said ball portion relative said socket portion releasably secures said ball portion to said socket portion when said flange and said pin cooperate with said flange notch and said locking keyway, respectively.

13. The apparatus of claim 12 wherein said flange notch is L-shaped and said locking keyway is 4-shaped.

14. The apparatus of claim 12 wherein said locking keyway has a first axial extent, a second axial extent and a circumferential extent adjoining said first and second axial extents.

15. The apparatus of claim 14 wherein said circumferential extent adjoins said first axial extent at a bottom point of said first axial extent and said circumferential extent adjoins said second axial extent at an intermediate point of said second axial extent.

16. The apparatus of claim 15 wherein said ball portion is releasably secured to said socket portion in both a first locking position in which said pin is positioned toward a top of said second axial extent and a second locking position in which said pin is positioned toward a bottom of said second axial extent.

17. The apparatus of claim 16 wherein said first locking position is characterized by said rod extending beyond a top of said ball and said second locking position is characterized by said rod positioned approximately flush with said top of said ball.

18. The apparatus of claim 17 wherein positioning the trailer on said ball moves said pin from said first locking position to said second locking position.

19. The apparatus of claim 17 wherein an axial and rotational movement of said ball portion relative to said socket portion in combination with temporarily depressing said rod releasably secures said ball portion to said socket portion.

20. The apparatus of claim 12 wherein said pin is biased toward and extends beyond said ball.

\* \* \* \* \*